(12) United States Patent
Udd et al.

(10) Patent No.: US 6,459,486 B1
(45) Date of Patent: Oct. 1, 2002

(54) SINGLE FIBER SAGNAC SENSING SYSTEM (76) Inventors: Eric Udd, 2555 NE. 205th Ave., Fairview, OR (US) 97024; Michael M. Morrell, 1323 E. Elm St., Tuscon, AZ (US) 85719

(*) Notice: Subject to any disclaimer, the term of this patent is extended or adjusted under 35 U.S.C. 154(b) by 0 days.

(21) Appl. No.: 09/520,771

(22) Filed: Mar. 8, 2000

Related U.S. Application Data (60) Provisional application No. 60/062,621, filed on Mar. 10, 1999.

(51) Int. Cl.[7] .................................................. G01B 9/02
(52) U.S. Cl. ........................................ 356/483; 356/478
(58) Field of Search ............................... 356/477, 478, 356/479, 483; 250/227.19, 227.27

(56) References Cited

U.S. PATENT DOCUMENTS

| | | | |
|---|---|---|---|
| 4,375,680 A | 3/1983 | Cahill et al. | |
| 4,572,949 A | * 2/1986 | Bowers et al. | 250/227.27 |
| 4,898,468 A | 2/1990 | Udd | |
| 4,976,507 A | 12/1990 | Udd | |
| 5,046,848 A | 9/1991 | Udd | |
| 5,223,967 A | 6/1993 | Udd | |
| 5,274,448 A | 12/1993 | Udd | |
| 5,311,592 A | 5/1994 | Udd | |
| 5,402,231 A | 3/1995 | Udd | |
| 5,422,772 A | 6/1995 | Udd et al. | |
| 5,455,698 A | 10/1995 | Udd | |
| 5,636,021 A | 6/1997 | Udd | |
| 5,675,674 A | * 10/1997 | Weis | 385/12 |
| 5,694,114 A | 12/1997 | Udd | |
| 5,754,293 A | * 5/1998 | Farhadiroushan | 356/478 |

OTHER PUBLICATIONS

Eric Udd, Sagnac Interferometer Based Secure Communication System, Proceedings of OFS–11, pp. 594–597, Sapporo, Japan, May, 1996.

Eric Udd in "Fiber Optic Sensors Based on the Sagnac Interferometer and Passive Ring Resonator", Fiber Optic Sensors: An Introduction for Engineers and Scientists, E. Udd Editor Wiley 1991.

* cited by examiner

Primary Examiner—Samuel A. Turner (57) ABSTRACT

The system includes a generally broadband, low coherence length light source that injects light into a fiber beamsplitter that is used to generate counterpropagating light beams in a Sagnac loop. The loop includes two facing fiber beamsplitters connected together at differing length inner legs, with one of the output legs of the second beamsplitter usually being connected to an optical fiber that ends with a phase modulator followed by a mirror. Environmental effects at the optical fiber impress relative phase differences between the counterpropagating light beams, which are detected from an interferometric signal that results therefrom.

5 Claims, 6 Drawing Sheets

SINGLE FIBER SAGNAC SENSING SYSTEM

This application claims the benefit of U.S. Provisional Application No. 60/062,621 by Eric Udd et al., entitled, "Single Fiber Sagnac Interferometer Based Secure Communication System" which was filed on Mar. 10, 1999.

REFERENCE TO RELATED PATENTS

This disclosure describes means to provide Sagnac sensing systems similar to those described in detail in U.S. Pat. No. 4,898,468 (E. Udd, Sagnac Distributed Sensor, Feb. 6, 1990), U.S. Pat. No. 4,976507 (E. Udd, Sagnac Distributed Sensor, Dec. 11, 1990), U.S. Pat. No. 5,046,848 (E. Udd, Fiber Optic Detection System Using a Sagnac Interferometer, Sep. 10, 1991), U.S. Pat. No. 5,402,231 (E. Udd, Distributed Sagnac Sensor Systems, Mar. 28, 1995), and U.S. Pat. No. 5,636,021 (E. Udd, Sagnac/Michelson Distributed Sensing Systems, Jun. 3, 1997) using a single installed optical fiber. Early work on using the Sagnac interferometer to detect time varying events can be found in U.S. Pat. No. 4,375,680 by Richard Cahill and Eric Udd, "Optical Acoustic Sensor" issued Mar. 1, 1983. The teachings in those patents are incorporated into this disclosure by reference as though fully set forth below.

BACKGROUND OF THE INVENTION

This invention relates generally to fiber optic sensing and more particularly to use of the Sagnac interferometer to measure and locate a time varying event. In order to make a system of this type more practical and widely applicable for general use, a flexible, single fiber configuration is needed to support the base of currently installed optical fiber and to simplify future installations.

The Sagnac interferometer provides means to sense time varying events such as acoustic waves and vibrations with high sensitivity and unique optical filtering action as is described by Eric Udd in "Fiber Optic Sensors Based on the Sagnac Interferometer and Passive Ring Resonator", Fiber Optic Sensors: An Introduction for Engineers and Scientists, E. Udd Editor, Wiley, 1991. These properties in combination with the ability of the Sagnac interferometer to be supported by low cost components, such as light emitting diodes, have allowed the usage of these devices as optical microphones, hydrophones and for intrusion sensing.

By combining properties of the Sagnac interferometers with color coded reflectors such as fiber gratings, it is possible to measure the presence of a time varying signal and localize it on a single optical fiber. These properties enable a system to be constructed that allows the transmission of information from multiple points along the single fiber that may be related to data transmission, sensing information, or a combination of both.

SUMMARY OF THE INVENTION

There is provided by this invention a Sagnac interferometer based sensing system that allows the measurement of the amplitude of a time varying event along a single fiber and with suitably placed reflectors, localization of the event.

The system includes a light source that is generally broadband with a low coherence length. The light source injects light into a fiber beamsplitter that is used to generate counterpropagating light beams in a Sagnac loop. The loop includes two facing fiber beamsplitters connected together at both inner legs, with one of the output legs of the second beamsplitter being connected to a single fiber that is the sensing leg of the system. The sensing leg has the ability to measure time varying signals such as acoustics or vibrations. By using a controlled device to induce time varying changes in optical pathlength on the fiber, data may be sent. Placing multiple colored reflectors in line allows environmental effects to be localized and data to be transmitted from multiple points.

Therefore, it is an object of the present invention to provide a single fiber Sagnac system that can be used to measure time varying events.

Another object is to enable the determination of the position of a time varying event along the single fiber line.

Another object is simultaneously measure the amplitude and location of a time varying event allowing information necessary for classification.

Another object of the invention is to allow the transmission of data via the simple attachment of a phase modulator to a sensing leg.

Another object of the invention is to allow the transmission of data from multiple points along a single fiber.

These and other objects and advantages of the present invention will become apparent to those skilled in the art after considering the following detailed specification including the drawings wherein:

DETAILED DESCRIPTION OF THE INVENTION

Figure 1:
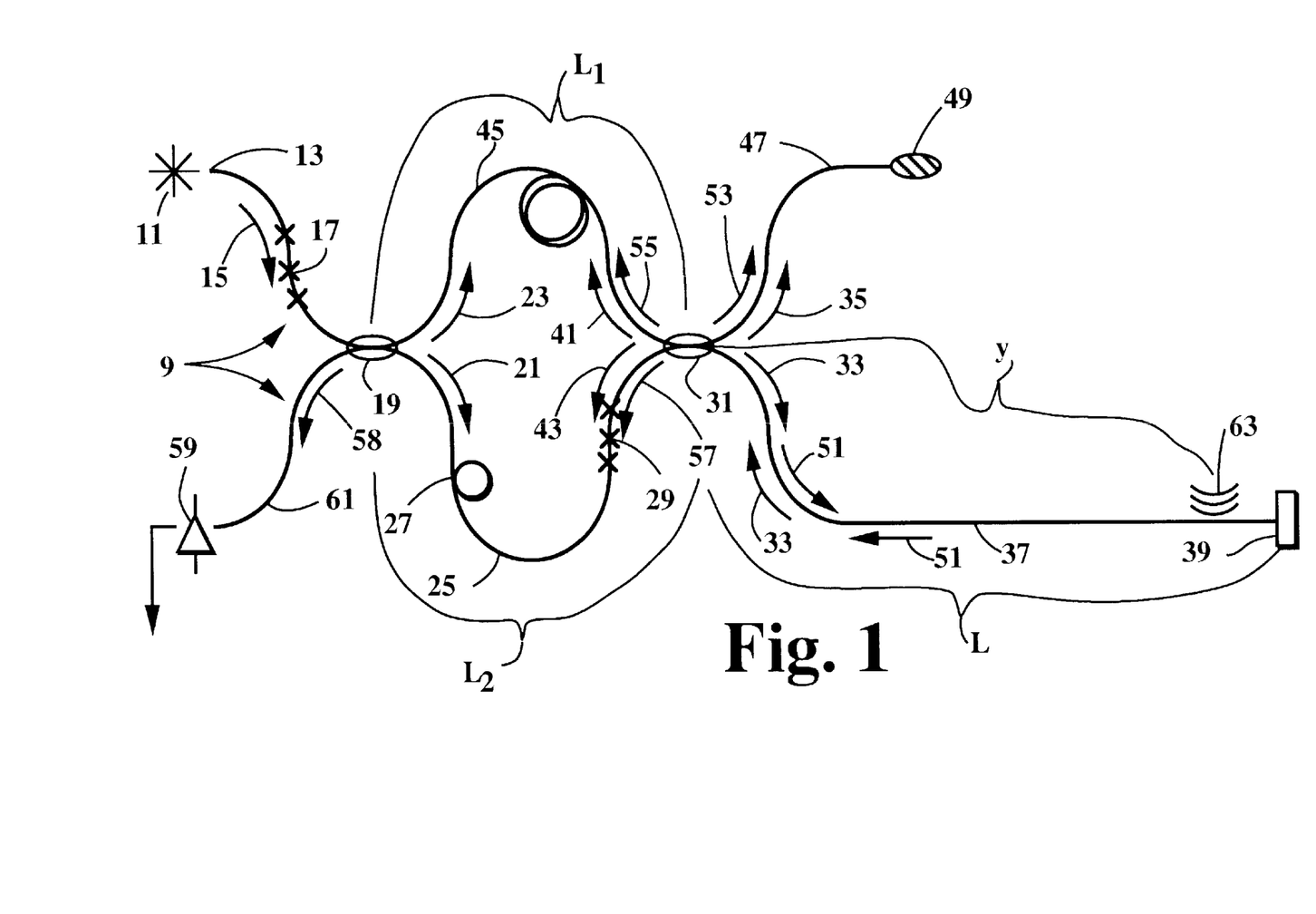
FIG. 1 is a schematic representation of a single fiber Sagnac sensor capable of measuring time varying events.

FIG. 1 is a diagram of a basic single fiber Sagnac sensor system 9 that is capable of measuring a time varying event along its length. The time varying event could be an acoustic wave or a vibration. A light source 11 that may be a short coherence length light source such as a light emitting diode is used to couple light into the optical fiber end 13 generating the light beam 15. The light beam 15 passes through a polarization scrambling element 17 that is used to reduce polarization preferences associated with the light source 11. The light beam 15 continues to a central beamsplitter 19 where it generates counterpropagating light beams 21 and 23. The light beam 21 propagates through the fiber leg 25 of length L2 through the phase modulator 27 that is used to provide a dynamic bias to the system 9 optimizing sensitivity. The light beam 21 continues past another polarization scrambler 29 that is used to reduce polarization induced noise in the system 9. The light beam 21 then passes through a second beamsplitter 31 where it is split into the light beams 33 and 35. The light beam 33 propagates through the fiber leg 37 that is used for the sensing of time varying effects. The light beam 33 then reflects off the reflective element 39 that may be a dielectric mirror. The light beam 33 then returns to the beamsplitter 31 where it is split into the light beams 41 and 43. The light beam 43 returns to the beamsplitter 19 via the fiber leg 25 via the polarization scrambler 29 and the phase modulator 27. The light beam 41 propagates through the fiber leg 45 that is of length L1 and returns to the first fiber beamsplitter 19.

The light beam 35 propagates through the fiber leg 47 and exits the system via the terminated end 49 that is designed to avoid back reflection. Alternatively, the leg 47 could be arranged to be a second sensing leg by positioning a reflective element on its end similar to that associated with the fiber 37 and reflective means 39.

The light beam 23 propagates along the fiber leg 45 and reaches the fiber beamsplitter 31 where it is split into the light beams 51 and 53. The light beam 53 propagates along the fiber leg 47 and exits the system via the terminated end 49. The light beam 51 propagates along the fiber leg 37 and is reflected off the reflective element 39 and returns to the beamsplitter 31. The light beam 51 is then split into the light beams 55 and 57. The light beam 55 is directed to the beamsplitter 19 by the fiber leg 45. The light beam 57 is directed to the beamsplitter 19 by the fiber leg 25 via the polarization scrambler 29 and the phase modulator 27. The polarization scrambler 29 could also be placed in the leg 45 instead of the leg 25 and still act effectively. It has been found experimentally that placing polarization scramblers in both legs 25 and 45 is not as effective nor is placing the polarization scrambler in the fiber sensing leg 37. Optimally the polarization scrambler 29 should be placed in either the leg 25 or the leg 45. In the case of FIG. 1, it has been shown in the fiber leg 25.

At this point four light beams 41, 43, 55 and 57 have all returned after passing through the system to the fiber beamsplitter 19. In order for the light beams to interfere, they should have passed through optical pathlengths that are different by less than the coherence length of the light source 11. In particular the light beam 41 has passed though the optical lengths L2, L1 and 2L associated with legs 25, 45 and twice through 37. The light beam 57 has passed through the lengths L1, L2 and 2L associated with the legs 45, 25 and twice though 37. Thus the light beams 41 and 57 traverse nearly identical paths with environmental effects being primarily responsible for any net difference in net optical pathlength. The light beam 43 propagates through a length equal to 2L2 and 2L while the light beam 55 propagates through a path equal to 2L1 and 2L. Because the difference in pathlength between L1 and L2 is arranged to be much larger than the coherence length of the light source 11 there is no interference between the light beams 43 and 55 and any of the other light beams, only 41 and 57 interfere with each other.

When the relative phase between 41 and 57 is equal, the two light beams interfere constructively and all the light is directed toward the light source 11. When the light beams 41 and 57 are 180° out of phase with respect to each other, all the light is directed in a light beam 58 toward an output detector 59 via the fiber leg 61. Now consider a time varying environmental effect 63 that interacts with the sensing leg 37 a distance y from the beamsplitter 31.

Figure 2:
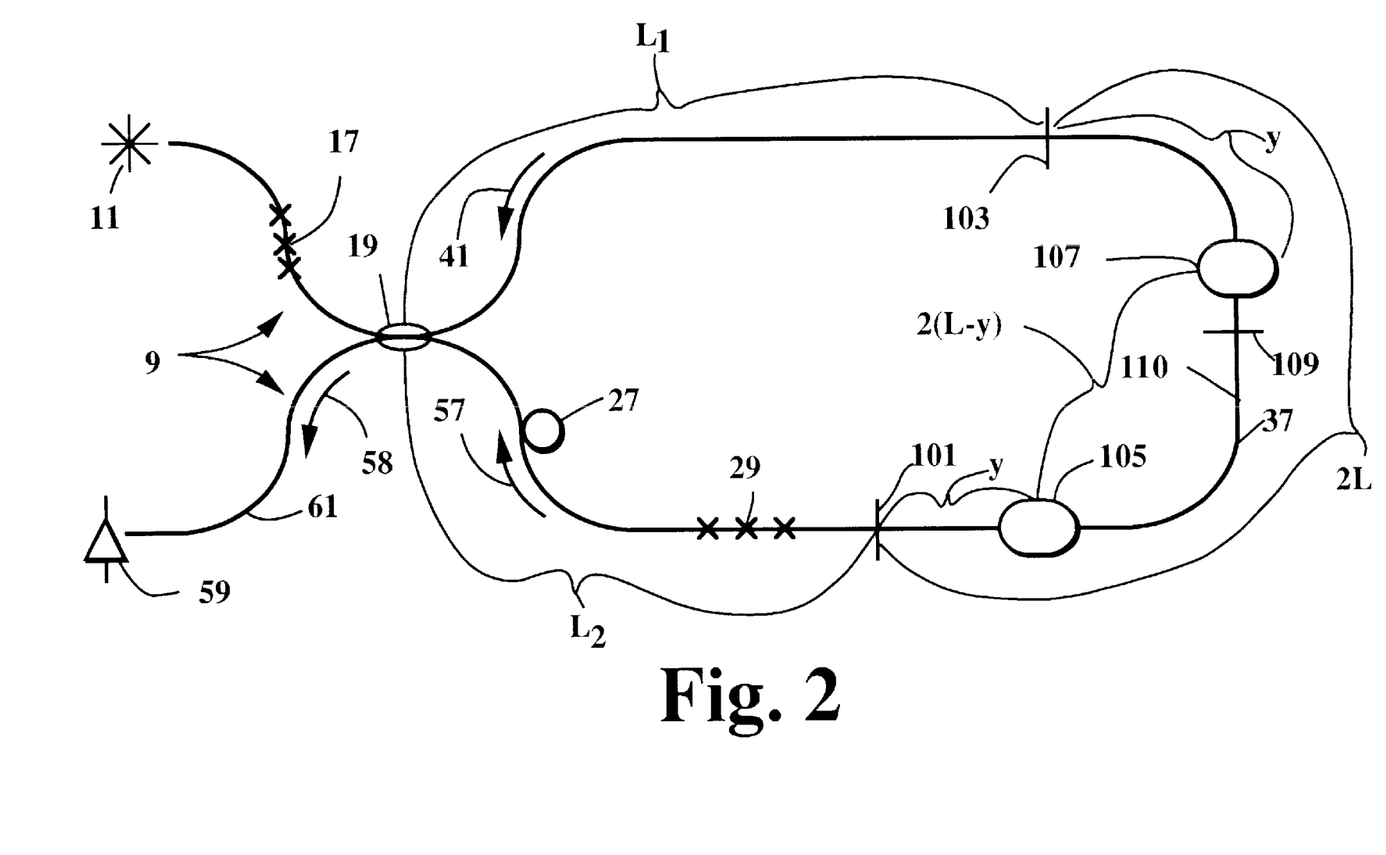
FIG. 2 is a schematic representation of a single fiber Sagnac interferometer showing the relationship between the position of a time varying event and pathlengths to the central beamsplitter.

FIG. 2 is used to illustrate the action of the time varying environmental effect on the net phase difference between the counterpropagating light beams 41 and 57 associated with FIG. 1. Referring to the diagram the points 101 and 103 correspond to the position of the beamsplitter 31 of FIG. 1. The points 105 and 107 correspond to the locations where the time varying environmental effect is acting on the fiber leg 37. In order to induce a net phase difference between the two light beams 41 and 57, the position of the time varying environmental effect 63 must be offset from the center 109 of the fiber loop 110 since both beams 33 and 51 arrive at this point simultaneously. In order for the net induced phase difference between the light beams 41 and 57 to be additive, the positions of 107 and 105, contrary to what is shown in FIG. 2, need to be on the same side of the center point 109. Otherwise, the induced phases are opposite and they subtract reducing the net overall effect. From this it is evident that the difference in pathlength between L1 and L2 should be chosen so that the entire length L of the sensing leg 37 is on one side or the other of the center point of the loop 39.

Figure 3:
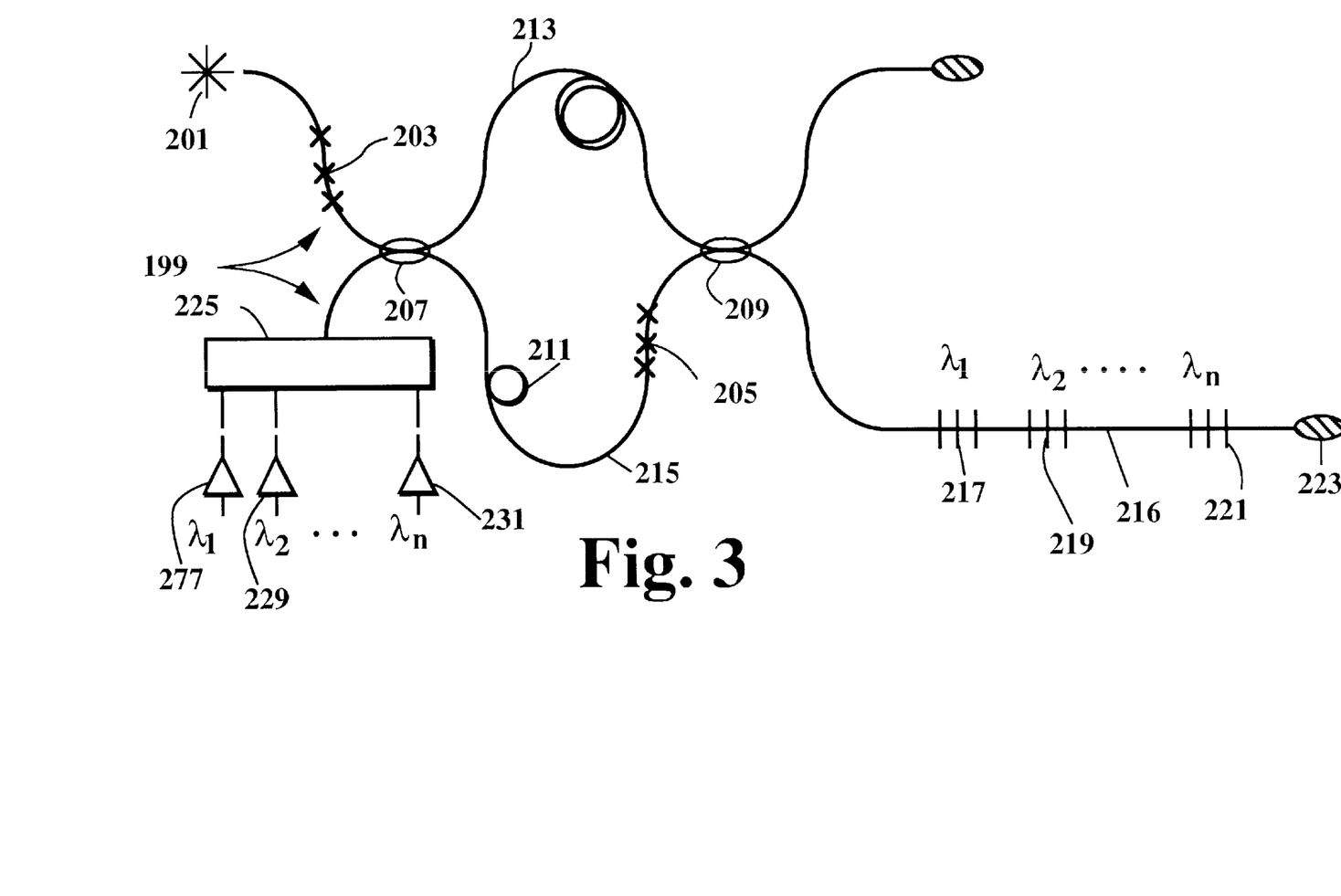
FIG. 3 is a schematic representation of a single fiber Sagnac distributed sensor that uses fiber gratings to support localization of a time varying event.

Thus far the present single fiber Sagnac sensor has been described configured to detect a time varying signal along its length without determining location. In order to determine location, some indicator of position is necessary. FIG. 3 illustrates a system 199 that uses fiber gratings to achieve localization. The light source 201 may be a broadband low coherence length light source. The polarization scramblers 203 and 205 can be used to reduce polarization sensitivity associated with the system 199 as described earlier. The beamsplitters 207 and 209, the phase modulator 211 and the fiber legs 213 and 215, perform functions analogous to those described in association with FIG. 1. In the single fiber sensing leg 216, color reflecting elements that may be fiber gratings, 217, 219 and 221 are positioned between the beamsplitter 209 and the terminating end 223 that acts to remove any light entering into it. The color reflecting elements 217, 219 and 221 centered at wavelengths $\lambda_1$, $\lambda_2$, and up to $\lambda_n$ respectively are used to define single fiber Sagnac interferometers operating at different and separate wavelength bands defined by the reflectors 217, 219 and 221. Each of these single fiber Sagnac interferometers can be monitored separately via the action of the wavelength division multiplexing element 225, which acts to split the operating wavelength bands onto the output detectors 227, 229 and 231. When a time varying event occurs, its location will be defined by which segments provide an output signal. All segments farther from the fiber beamsplitter 209 relative to the point at which the environmental effect occurs will carry the signal while nearer segments will not allowing the signal to be localized.

Figure 4:
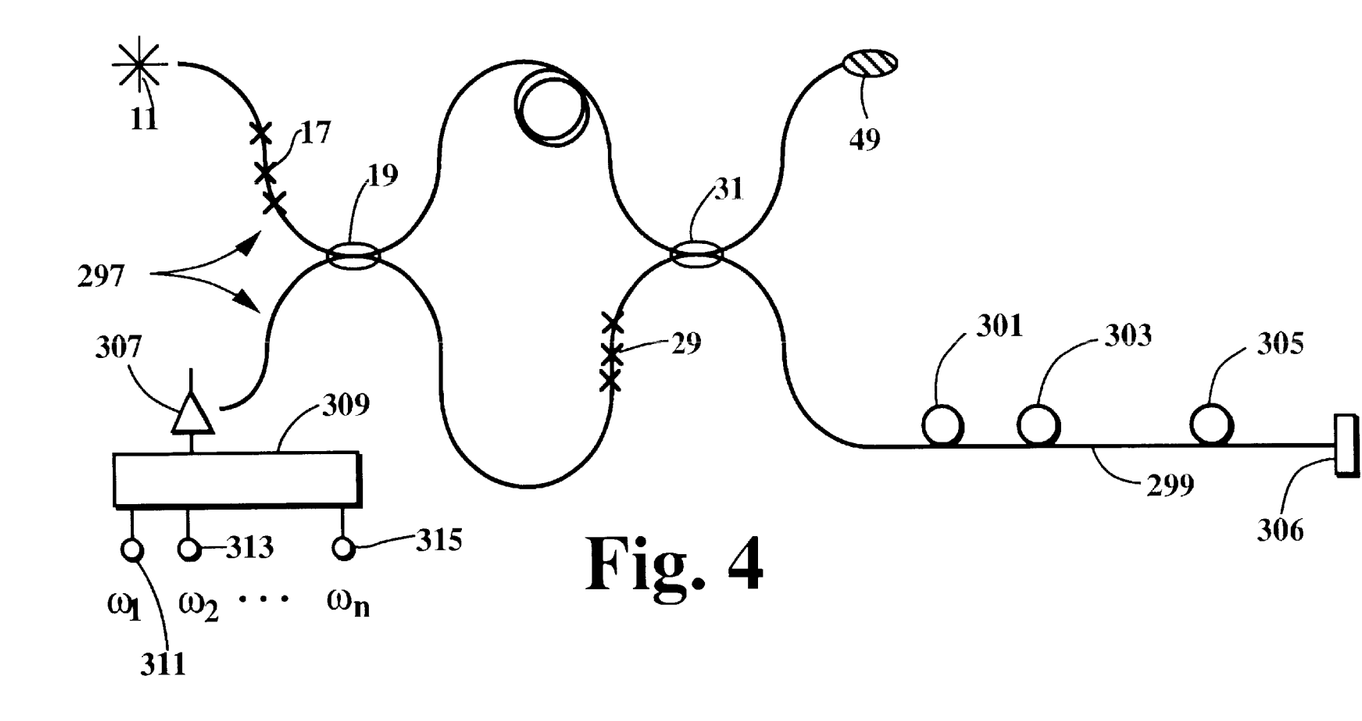
FIG. 4 is a schematic representation of a single fiber Sagnac distributed sensor that includes a plurality of spaced phase modulators at different frequencies to support localization of a time varying event.

In some cases it is highly desirable to be able to transmit data from multiple points on a single fiber line. An example would be transmitting data back from an oil or gas well. FIG. 4 illustrates how this could be accomplished by using a slightly modified single fiber Sagnac sensor system 297. Along the sensing fiber 299 are place a series of phase modulators 301, 303 and 305 operating at the carrier frequencies $\omega_1$, $\omega_2$, and up to $\omega_n$. The sensing fiber is terminated by a reflecting element 306. The amplitude of the phase modulated signal at these carrier frequencies could be modulated or the frequency varied along the carrier band to allow for data transmission at multiple points. The outputs from the various phase modulators 301, 303 and 305 are read out via the detector 307 whose output electrical signal is separated by a demodulator element 309 into the various carrier frequency outputs 311, 313 and 315.

Figure 5:
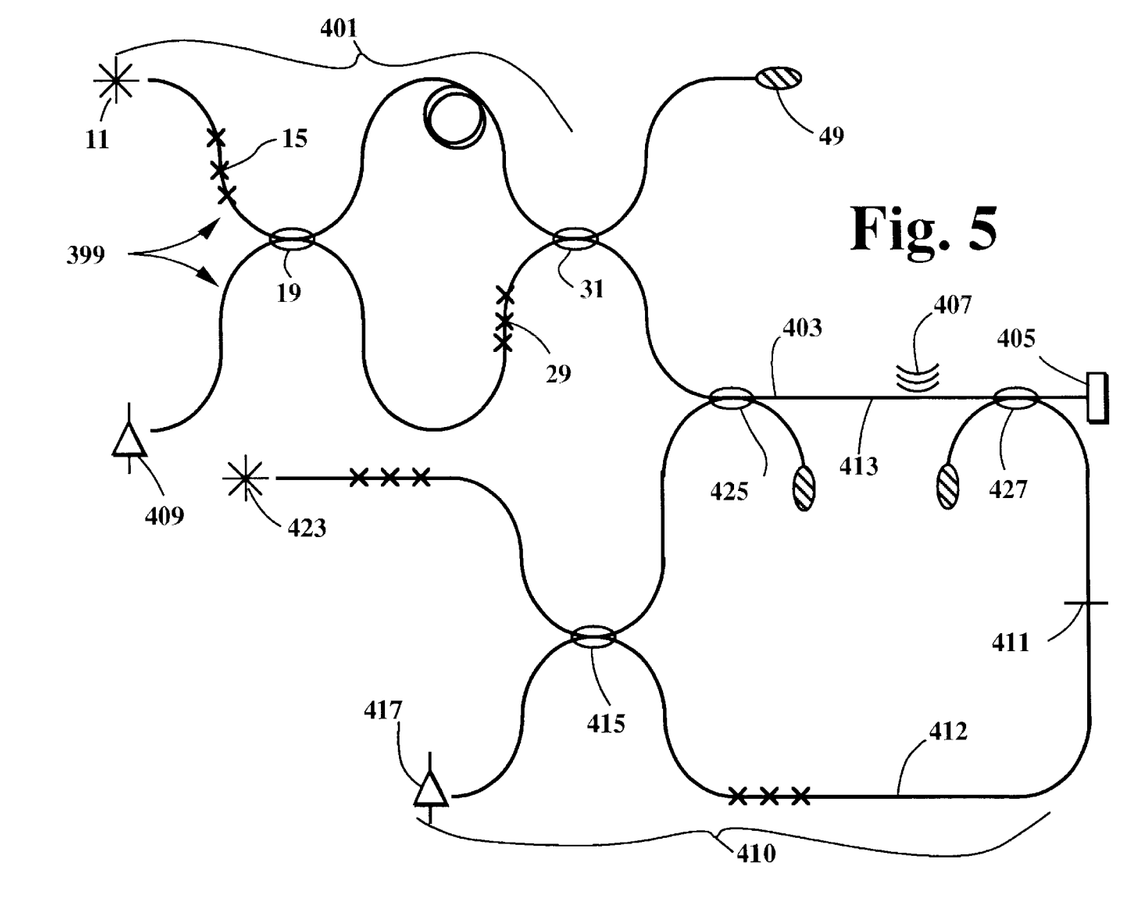
FIG. 5 is a schematic representation of a single fiber Sagnac distributed sensor that includes an unfolded Sagnac sensor with a separate light source to support localization of a time varying event.

The response of the single fiber Sagnac loop is flat over the sensing fiber leg. This response is different from an unfolded Sagnac loop, which has no sensitivity in the center of the loop and increasing sensitivity near the central fiber beamsplitter. This situation allows for distributed fiber sensing to occur where the amplitude of a time varying event may be measured by the single fiber Sagnac sensor and the position can be monitored by the ratio of the open and single fiber responses. FIG. 5 illustrates this embodiment 399.

The input end 401 of the single fiber Sagnac sensor 399 is used to support the single fiber sensing leg 403 terminated by the reflecting element 405. The response of the time varying environmental effect 407 acting on the fiber leg 403 results in a position independent output on the single fiber Sagnac sensor detector 409. A second open loop Sagnac sensor system 410 has no response to a time varying environmental effect at the center 411 of its loop 412. Over the fiber segment 413, which is shared with the single fiber Sagnac fiber leg 403, the response of the open loop Sagnac sensor system 410 increases linearly as the position of the time varying environmental effect 407 moves toward the beamsplitter 415. Taking the ratio of the output of the detectors 409 and 417 allows the position of the time varying environmental event to be located, as is described in the earlier cited patents. It is possible to run the system 399 at a single wavelength by using fiber beamsplitters at the common wavelength. Alternatively by using wavelength division multiplexing elements the single fiber Sagnac 401 and loop Sagnac 410 can be run independently. As an example the light source 11 could operate at wavelength $\lambda_1$ which could be 1300 nm and the light source 423 could operate at the wavelength $\lambda_2$, which might be 1550 nm. The wavelength division multiplexing elements 425 and 427 could then operate to let $\lambda_1$ pass straight through and cross couple $\lambda_2$ for optimal operation.

Figure 6:
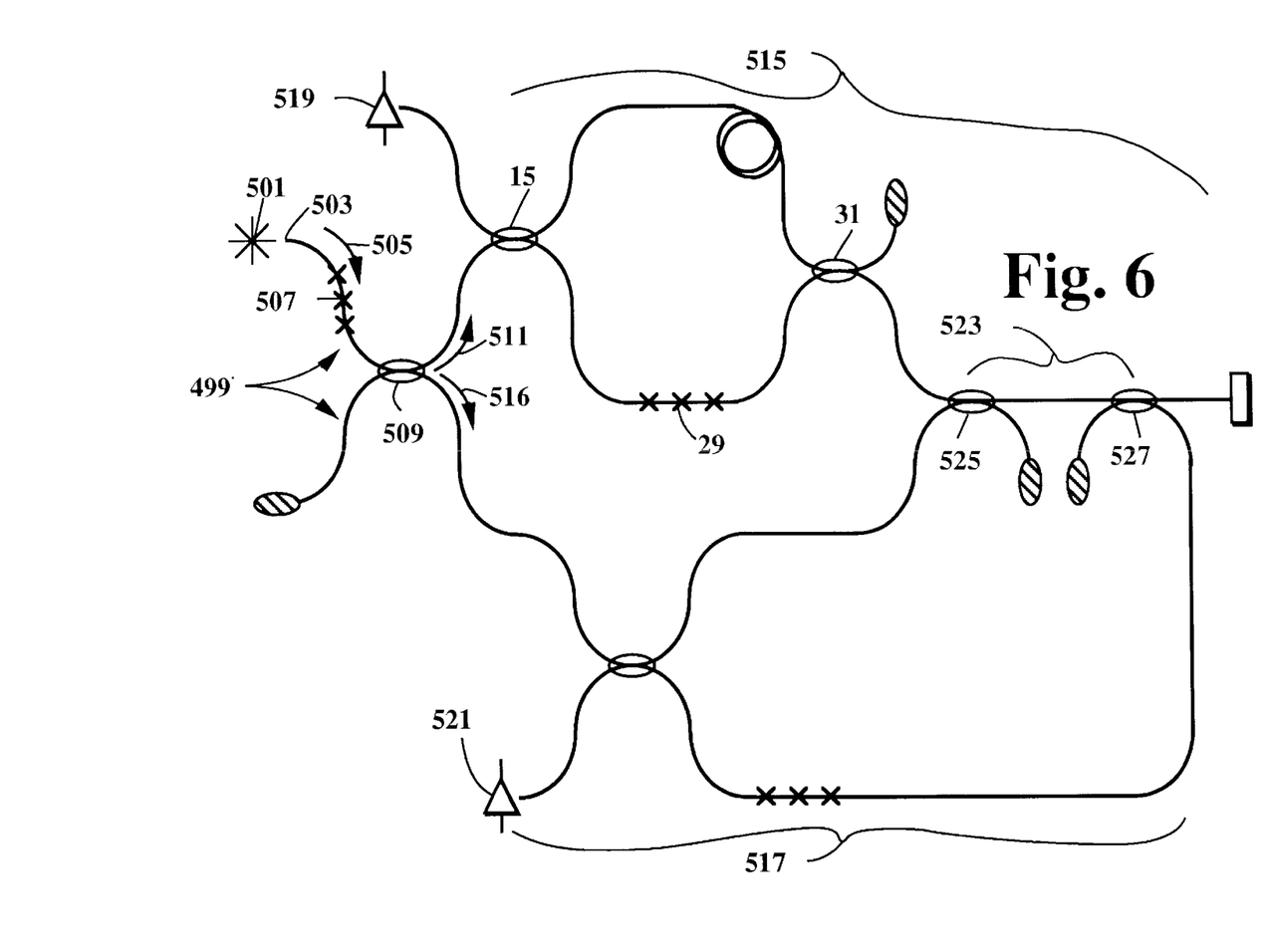
FIG. 6 is a schematic representation of a single fiber Sagnac distributed sensor that includes an unfolded Sagnac sensor with a shared light source to support localization of a time varying event.

It is possible to operate both the single fiber Sagnac sensor system 399 and an unfolded Sagnac loop system 410 with a single light source sacrificing optical power. FIG. 6 shows a system 499 with a light source 501 that couples light into the fiber end 503 to form the light beam 505. A polarization scrambler 507 is used to reduce residual polarization. The light beam 505 is split by the beamsplitting element 509 into the light beam 511 that is used to support the single fiber Sagnac sensor 515 and the light beam 516 that is used to support the unfolded Sagnac sensor 517. The output of the single fiber Sagnac sensor system 515 from the detector 519 can be used in combination with the output from the unfolded Sagnac sensor detector 521 to determine the amplitude and location of a time varying environmental event along the fiber leg 523. For optimum performance, the beamsplitters 525 and 527 would be approximately 50/50 if no additional spectral separation provision were made to effectively force the single light source 501 to act like two in analogy to FIG. 5. The pathlengths within the single fiber Sagnac sensor system 515 and the unfolded Sagnac loop system 521 are different so that the light beams circulating within one system do not interfere in the other.

Thus there has been shown and described novel fiber optic secure communication systems which fulfill all of the objects and advantages sought therefor. Many changes, modifications, alterations and other uses and applications which do not depart from the spirit and scope of the invention are deemed to be covered by the invention which is limited only by the claims which follow.

What is claimed is:

1. A Sagnac interferometer based sensor system including:

first light source means for producing a first light beam having:
a coherence length;
a first beamsplitter positioned to receive the first light beam and split it into second and third light beams;
a second beamsplitter positioned to receive the second and third light beams and split the second light beam into fourth and fifth light beams and the third light beams into sixth and seventh beams;
a first optical pathway extending between said first and second beamsplitters on which the second light beam travels;
a second optical pathway of different length from said first optical pathway extending between said first and second beamsplitters on which the third light beam travels, the different length of said first and second optical pathways exceeding said coherence length;
a third optical pathway extending from said second beamsplitter, on which the fourth and sixth light beams are impressed, said third optical pathway being exposed to at least one effect to be sensed;
beam reversal means positioned to direct the fourth and sixth light beams that been effected by the at least one effect back through said the at least one effect to said second beamsplitter;
detector means operatively connected to said first beamsplitter to receive an interference light beam from said first beamsplitter and to detect the at least one effect therefrom; and
said first light source means produce a first light beam having a plurality of colors and wherein said beam reversal means include:
a plurality of color reflecting elements spaced along said
third optical pathway, and wherein said detector means include:
a plurality of output detectors; and
a wavelength division multiplexing element for splitting the plurality of colors onto said plurality of output detectors.

2. The Sagnac interferometer based sensor system as including:

first light source means for producing a first light beam having:
a coherence length;
a first beamsplitter positioned to receive the first light beam and split it into second and third light beams;
a second beamsplitter positioned to receive the second and third light beams and split the second light beam into fourth and fifth light beams and the third light beams into sixth and seventh beams;
a first optical pathway extending between said first and second beamsplitters on which the second light beam travels;
a second optical pathway of different length from said first optical pathway extending between said first and second beamsplitters on which the third light beam travels, the different length of said first and second optical pathways exceeding said coherence length;
a third optical pathway extending from said second beamsplitter, on which the fourth and sixth light beams are impressed, said third optical pathway being exposed to at least one effect to be sensed;
beam reversal means positioned to direct the fourth and sixth light beams that have been effected by the at least one effect back through said the at least one effect to said second beamsplitter;

detector means operatively connected to said first beamsplitter to receive an interference beam from said first beamsplitter and to detect the at least one effect therefrom; and said third optical pathway includes: a plurality of phase modulators spaced therealong, each operating at a different frequency, and wherein said detector means include:
   an output detector producing an electrical output; and
   a demodulator element for spitting the electrical output into a plurality of carrier frequency outputs.

3. A Sagnac interferometer based sensor system including:

first light source means for producing a first light beam having:
   a coherence length;

a first beamsplitter positioned to receive the first light beam and split it into second and third light beams;

a second beamsplitter positioned to receive the second and third light beams and split the second light beam into fourth and fifth light beams and the third light beams into sixth and seventh beams;

a first optical pathway extending between said first and second beamsplitters on which the second light beam travels;

a second optical pathway of different length from said first optical pathway extending between said first and second beamsplitters on which the third light beam travels, the different length of said first and second optical pathways exceeding said coherence length;

a third optical pathway extending from said second beamsplitter, on which the fourth and sixth light beams are impressed, said third optical pathway being exposed to at least one effect to be sensed;

beam reversal means positioned to direct the fourth and sixth light beams that have been effected by the at least one effect back through said the at least one effect to said second beamsplitter;

detector means operatively connected to said first beamsplitter to receive an interference beam from said first beamsplitter and to detect the at least one effect therefrom; and further including:
   an unfolded loop Sagnac interferometer system having:
      a loop, a portion of which is formed by said third optical pathway.

4. The Sagnac interferometer based sensor system as defined in claim 3 wherein said unfolded loop Sagnac interferometer system includes:

second light source means which operate at a frequency band different from said first light source means; and wavelength division multiplexing elements coupling said unfolded loop Sagnac interferometer system to said third optical pathway.

5. The Sagnac interferometer based sensor system as defined in claim 3 further including:

a fourth beamsplitter positioned to split said first light beam so that a first portion thereof is transmitted to said first beamsplitter to be split into said second and third light beams and a second portion thereof is transmitted to said unfolded loop Sagnac interferometer system which further includes:

a detector, whereby the relative amplitude of the outputs of said detector means and said detector can be used to determine the location of a sensed at least one effect along said third optical pathway.

* * * * *